(12) United States Patent
Muller

(10) Patent No.: US 9,386,236 B2
(45) Date of Patent: Jul. 5, 2016

(54) PERIODIC FRINGE IMAGING WITH STRUCTURED PATTERN ILLUMINATION AND ELECTRONIC ROLLING SHUTTER DETECTION

(71) Applicant: Matthew Stefan Muller, Toronto (CA)

(72) Inventor: Matthew Stefan Muller, Toronto (CA)

(73) Assignee: Muller Imaging Technologies, Inc, Toronto, Ontario (CA)

(*) Notice: Subject to any disclaimer, the term of this patent is extended or adjusted under 35 U.S.C. 154(b) by 2 days.

(21) Appl. No.: 14/605,902

(22) Filed: Jan. 26, 2015

(65) Prior Publication Data

US 2015/0215547 A1    Jul. 30, 2015

Related U.S. Application Data

(60) Provisional application No. 61/931,643, filed on Jan. 26, 2014.

(51) Int. Cl.
| | |
|---|---|
| *H04N 5/235* | (2006.01) |
| *H04N 5/74* | (2006.01) |
| *H04N 5/265* | (2006.01) |
| *G01J 3/28* | (2006.01) |
| *G02B 21/00* | (2006.01) |

(52) U.S. Cl.
CPC .............. *H04N 5/265* (2013.01); *G01J 3/2803* (2013.01); *G02B 21/004* (2013.01); *G02B 21/008* (2013.01); *G02B 21/0032* (2013.01); *H04N 5/2354* (2013.01); *H04N 5/74* (2013.01)

(58) Field of Classification Search
CPC ....... H04N 5/265; H04N 5/2354; H04N 5/74; G02B 21/004; G02B 21/0032; G02B 21/008; G01J 3/2803

USPC ............ 348/68, 70, 132, 136, 175, 177, 180, 348/226, 333.1, 370, 414.1, 744, 91, 2, 348/E13.018
See application file for complete search history.

(56) References Cited

U.S. PATENT DOCUMENTS

| | | | | |
|---|---|---|---|---|
| 5,028,802 A | * | 7/1991 | Webb | A61B 3/1025 250/235 |
| 5,587,832 A | | 12/1996 | Krause | |
| 6,061,188 A | * | 5/2000 | Kamon | G03F 7/706 359/631 |
| 6,243,197 B1 | | 6/2001 | Schalz | |

(Continued)

FOREIGN PATENT DOCUMENTS

| | | |
|---|---|---|
| EP | 2503852 A1 | 9/2012 |
| WO | 2012/002893 A1 | 1/2012 |
| WO | 2012/066501 A1 | 5/2012 |

OTHER PUBLICATIONS

Communication: the extended European search report; date Jul. 14, 2015; 8 pages; published by the European Patent Office.

(Continued)

*Primary Examiner* — Hung Lam
(74) *Attorney, Agent, or Firm* — Taft Stettinius & Hollister LLP; Ryan O. White

(57) ABSTRACT

The present invention relates to a method of obtaining multiple images with a spatially varying periodic fringe pattern produced by a digital light projector that is spatially and temporally synchronized to the rolling shutter exposure of a two-dimensional pixel array detector. Two or more images obtained with phase-shifted spatial fringe patterns are combined to form a composite image with the spatial fringes and other unwanted scattered light removed.

15 Claims, 2 Drawing Sheets

(56) References Cited

U.S. PATENT DOCUMENTS

| | | | |
|---|---|---|---|
| 6,376,818 B1 | 4/2002 | Wilson et al. | |
| 6,483,641 B1 | 11/2002 | MacAulay | |
| 6,885,492 B2 | 4/2005 | DeSimone et al. | |
| 8,237,835 B1* | 8/2012 | Muller | A61B 3/1025 250/201.9 |
| 8,970,671 B2* | 3/2015 | Pavani | G02B 21/16 348/46 |
| 9,086,536 B2* | 7/2015 | Pang | G02B 5/1842 |
| 2006/0017001 A1 | 1/2006 | Donders et al. | |
| 2006/0109088 A1* | 5/2006 | Sagan | G06K 15/1252 340/286.06 |
| 2009/0218527 A1 | 9/2009 | French et al. | |
| 2009/0244482 A1 | 10/2009 | Elsner et al. | |
| 2015/0138346 A1* | 5/2015 | Venkataraman | G01B 11/22 348/135 |

OTHER PUBLICATIONS

O. Ait-Aider, N. et al.; "Simultaneous object pose and velocity computation using a single view from a rolling shutter camera;" In Proc. European Conference on Computer Vision; pp. 56-68; 2006.

Andor; "Mosaic 3: Next Generation, Digital Illumination;" Product Manual; pp. 1-11; 2014.

Basler; "Users Manual for USB 3.0 Cameras;" Document AW001234; pp. 1-272; Apr. 16, 2014.

Cha, et al.; "3D Profilometry Using a Dynamically Configurable Confocal Microscope. Three-Dimensional Image Capture and Applications;" Proc. of SPIE, 3640; 246-253; 1999.

Cha, et al.; "Nontranslational three-dimensional profilometry by chromatic confocal microscopy with dynamically configurable micromirror scanning;" Applied Optics, vol. 39, Issue 16; pp. 2605-2613; Jun. 1, 2000.

Chen, et al.; "Full-field chromatic confocal surface profilometry employing DMD correspondence for minimizing lateral cross talks;" Optical Engineering vol. 51(8); 081507-1-081507-10; Aug. 2012.

Cho, et al.; "CMOS digital image stabilization;" IEEE Trans. on Consumer Electronics, vol. 53, No. 3; pp. 979-986; Aug. 2007.

Kodak; "Shutter Operations for CCD and CMOS Image Sensors;" Application Note, Revision 2.0; pp. 1-4, Dec. 17, 2003.

C. Guan, L. G. Hassebrook; "Composite structured light pattern for three-dimensional video;" Optics Express, 5; 406-417; (2003).

Jiang S, Walker J; "Differential high-speed digital micromirror device based fluorescence speckle confocal microscopy;" Applied Optics, 49: 497-504; (2010).

Texas Instruments; "TIDA-00254: Accurate Point Cloud Generation for 3D Machine Vision Applications using DLP® Technology and Industrial Camera;" User's Guide; pp. 1-79; Jul. 2014.

Texas Instruments; "DLP® LightCrafter™ FPGA Overview;" Application Report DLPA042; pp. 1-12; Oct. 2013.

Texas Instruments; "DLP® LightCrafter™ Evaluation Module (EVM);" User's Guide, Literature No. DLPU006E; pp. 1-64; Jan. 2012.

Delica S. and Blanca C. M.; "Wide-field depth-sectioning fluorescence microscopy using projector-generated patterned illumination;" Appl. Opt. 46(29); 7237-7243; (2007).

Fukano T, Miyawaki A.; "Whole-field fluorescence microscope with digital micromirror device: imaging of biological samples;" Appl. Opt 42; 4119-4124; (2003).

Hoefling, R., & Aswendt, P.; "Real-time 3D shape recording by DLP-based all-digital surface encoding;" Proc. SPIE 7210; 72100E-1-72100E-8; (2009).

Point Grey Research® Inc; "Flea3 FL3-U3 USB 3.0 Digital Camera;" Technical Reference Manual Version 5.2; Revised Sep. 27, 2012.

Jae-Hyeung Park, Kyeong-Min Jeong; "Frequency domain depth filtering of integral imaging;" Opt. Express 19; 18729-18741; (2011).

S Zhang, St Yau; "High-resolution, real-time 3D absolute coordinate measurement based on a phase-shifting method;" Optics Express 14 (7); 2644-2649; 2006.

Yajun Wang, S. Zhang, James H. Oliver; "3D shape measurement technique for multiple rapidly moving objects;" Optics Express, vol. 19; 8539-8545; (2011).

Heintzmann, R., et al; "An optical sectioning programmable array microscope implemented with a digital micromirror device;" Journal of Microscopy 196 (Pt.3); 317-331; 1999.

Texas Instruments; "DLP® LightCrafter™ Evaluation Module (EVM);" User's Guide, Literature No. DLPU006; pp. 1-33; Jan. 2012.

Baumgart, E. & Kubitscheck, U.; "Scanned light sheet microscopy with confocal slit detection;" Opt. Express 20; 21805-21814; (2012).

Bitte, et al.; "MicroScan: a DMD-based optical surface profiler;" SPIE vol. 4093; pp. 309-318; (2000).

Neil, M. A. A., Juskaitis, R. and Wilson, T.; "Method of obtaining optical sectioning by using structured light in a conventional microscope;" Optics Letters 22; 1905-1907; (1997).

Y. Xu et al.; "Phase error compensation for three-dimensional shape measurement with projector defocussing;" Appl. Opt. 50(17); pp. 2572-2581; (2011).

S. Lei and S. Zhang; "Flexible 3-D shape measurement using projector defocussing;" Opt. Lett. 34(20); 3080-3082; (2009).

M. Halioua and L.C. Liu; "Optical Three-dimensional Sensing by Phase Measuring Profilometry;" Optics and Lasers in Engineering 11; 185-215; (1989).

H. Zhao, W. Chen, and Y. Tan; "Phase unwrapping algorithm for the measurement of three dimensional object shapes" Appl. Opt., 33(20); 4497-4500; (1994).

Yong Li et al.; "High-speed three-dimensional shape measurement for isolated objects based on fringe projection:" Journal of Optics, vol. 13, No. 3; pp. 1-7; (2011).

Mertz, J. and Kim, J.; "Scanning light-sheet microscopy in the whole mouse brain with HiLo background rejection;" J. Biomed. Opt. 15; 016027; 2010.

Schaefer, L. H., et al.; "Structured illumination microscopy: artifact analysis and reduction utilizing a parameter optimization approach;" Journal of Microscopy 216; 165-174; (2004).

L.G. Krzewina & M.K. Kim; "Structured Illumination Imaging:" Chap. 17 in Q. Wu, F. Merchant, and K. Castleman, eds., Microscope Image Processing; pp. 470-497; (2008).

Thomas B, Momany M, Kner P.; "Optical sectioning structured illumination microscopy with enhanced sensitivity;" Journal of Optics 15(9); pp. 1-10; (2013).

Zhang, et al.; "Simple calibration of a phase-based 3D imaging system based on uneven fringe projection;" Optics Letters 36 (5); 627-629; 2011.

Frankowski, G. and Hainich, R.; "DLP-Based 3D Metrology by Structured Light or Projected Fringe Technology for Life Sciences and Industrial Metrology;" Proc. SPIE, 7210; 72100C-1-72100C-12; (2009).

Geng, J.; "Structured-light 3D surface imaging: a tutorial;" Adv. Opt. Photo 3(2); 128-160; (2011).

Chasles, F. et al.; "Optimization and characterization of a structured illumination microscope;" Optics Express 15 (24); 16130-16140; (2007).

Dan, D., et al.; "DMD-based LED-illumination Super-resolution and optical sectioning microscopy;" Sci. Rep. 3, 1116; pp. 1-7; (2013).

* cited by examiner

PERIODIC FRINGE IMAGING WITH STRUCTURED PATTERN ILLUMINATION AND ELECTRONIC ROLLING SHUTTER DETECTION

CROSS-REFERENCE TO RELATED APPLICATIONS

This application is related and claims priority to U.S. Provisional Patent Application Ser. No. 61/931,643 filed on Jan. 26, 2014. The complete and entire disclosure for this application is hereby expressly incorporated herein by this reference.

BACKGROUND OF THE INVENTION

Digital light projectors, also commonly known as digital light processors, typically include one or more LED or semiconductor laser light sources, a spatial light modulator such as a digital micromirror device (DMD), driver electronics to convert pre-loaded images and streaming image and video input to timed micromirror actuation, and optics to relay the light source to the spatial light modulator and to then project an image onto an external target. To project an image comprising multiple overlapping colors and intensity levels, for example 24-bit RGB images, the DMD rapidly projects a series of 24 bit plane images. These bit plane images, each called an illumination pattern, can be set to have adjustable pattern periods and illumination exposure times to produce a desired image or video on a target. For example, to obtain 8-bit intensity shading, the projector's DMD is typically configured to display 8 bit plane illumination patterns. Each illumination exposure time and pattern period is typically set to be a factor of two greater than the previous pattern, so that the combined 8 illumination pattern intensity at the target can be set to 256 different levels for each micromirror array element in the DMD. The projector illumination source intensity is usually independently set with its drive current or modulation frequency to further control the illumination level.

Many commercially available projectors are configured to run in a series of fixed operating modes (for example, 24-bit 60 Hz RGB) since they are designed to project images and videos using known image and video formatting standards. Some commercially available projectors can be configured to run in a so-called structured illumination mode, whereby users are given control over the timing and number of illumination patterns through software. In this mode, a standard 24-bit 60 Hz RGB video or pre-loaded images are used as input that can be converted by the driver and displayed as a series of bit planes that are separated in time. An illumination pattern can consist of multiple bit planes, each projected using one or more illumination sources. The illumination patterns can be projected at higher speeds than 60 Hz, depending on the number of bit planes displayed per pattern. Since digital light projectors that incorporate a DMD produce images and videos on a target as a sequence of bit planes, those skilled in the art recognize that the structured illumination mode is simply a more flexible operating mode that can be made available to users with the use of driver electronics that control the illumination source timing and individual bit plane pattern timing.

When switching from one bit plane to the next, there is a certain 'off-time' or blanking time, during which time there is no light output from the projector. This blanking time can be inherent in the design of the projector and required for reasons such as resetting the position of the micromirrors in a DMD or for memory read or access functions when loading new DMD pattern data. The blanking time and duty cycle of the illumination in a projected pattern can also be set through software with a pattern period time that is greater than the pattern exposure time.

As an example, the Texas Instruments' DLP LightCrafter product can be configured in the aforementioned structured illumination mode to display a series of 1-bit plane monochrome patterns, either from a 60 Hz 24-bit RGB video input from a standard video display driver, such as used on personal computers, or from up to 96 1-bit per pixel bitmap patterns that have been pre-loaded into its flash memory. When projecting 1-bit plane patterns using the 60 Hz real-time video input, the maximum achievable pattern rate in this configuration is 24*60 Hz=1.44 kHz. When the patterns are pre-loaded, the projector can operate even faster, obtaining a maximum pattern rate of 4 kHz with a pattern exposure and pattern period time of 250 µsec when fewer than 24 patterns are preloaded. The maximum pattern rate decreases to 2.597 kHz when 24-96 patterns are preloaded due to an additional timing overhead of approximately 135 µsec. Pattern sequences can be customized with multiple output colors and bit depths, and can be configured to run in a loop (i.e. after the last pattern in the sequence, the sequence restarts and the first pattern is displayed).

Other currently available Texas Instruments' DLP and DMD products have similar functionality, with various speed and output specifications. The DLP LightCrafter timing overhead previously mentioned has been reduced in newer versions of Texas Instruments' DLP products so that there is very little inherent time delay between projecting multiple patterns, though the duty cycle can be adjusted with a pattern exposure time that is less than the pattern period. On these projectors, the start of each pattern can be controlled using an external or internal trigger, a strobe output for each pattern or a pattern sequence is typically available, and both the input and output trigger delay, pattern exposure time and pattern period can be set through software. The projectors are comprised of one or more LED or semiconductor laser illumination sources, a DMD, driver electronics, and optics to relay the light from the illumination source(s) to the DMD, and from the DMD to one or more lenses that allow the projection of an image or video onto a target that is external to the projector. Those skilled in the art will recognize that a projector can be custom-built using the above components and set to project a sequence of bit plane illumination patterns.

The rolling shutter method of detection in standard CMOS two dimensional pixel array sensors progressively exposes pixel rows to light during a frame exposure. Unlike the global shutter method of detection, in which all pixels are exposed to light simultaneously, rolling shutter detectors start the exposure of each pixel row at a slightly different time. A commonly stated downside of this method of detection is that it can result in motion artifacts when the target is moving throughout a frame exposure. Some CMOS sensors attempt to overcome this effect by using a global reset, which starts the exposure of all rows simultaneously, but has the undesirable result of having a non-constant exposure time for each row. CMOS rolling shutter sensors typically use a constant pixel clock signal to ensure constant pixel exposure. It is standard for a CMOS sensor to use a line, or horizontal clock, signal to properly acquire and transmit data to the sensor's controller (e.g. a computer). The line signal is usually derived from the sensor clock signal and is at a fixed and constant frequency during a frame exposure.

For the purposes of consistency with existing nomenclature on commercial sensor datasheets and for convenience, the rolling shutter is considered to expose pixels in a row-by-row fashion across the sensor's region of interest during a frame exposure. Rolling shutters on CMOS sensors are typically linear, i.e. they extend across one dimension of the two dimensional sensor. Rolling shutter detection can also be done on a column-by-column basis, or from the center of the 2-dimensional sensor out to the sides, as done on several commercially available scientific CMOS cameras, provided the sensor architecture and drivers support such operation.

The rolling shutter is not a physical (mechanical) shutter, but has been referred in prior art as an electronic shutter or as a spatial filter since only a subset of the total rows in the region of interest is exposed to light at any instant in time. The rolling shutter width is considered to be the number of pixel rows that are exposed at a given instant in time, and is calculated by multiplying the row exposure time by the horizontal clock frequency. Those skilled in the art will recognize that only the light that is incident an active row during the rolling shutter exposure will be detected. Unlike a global shutter sensor, light that is incident on a row during a frame exposure that is not within the instantaneous rolling shutter width will not be detected.

A projector can be configured in its structured illumination mode to rapidly project a sequence of linear illumination patterns onto a target. When the target is imaged by a two-dimensional CMOS sensor that uses a rolling shutter method of detection, the light return from the target can be spatially filtered when temporal and spatial synchronization exists between the rolling shutter exposure and the illumination line patterns. This effect has been documented in prior art for confocal ophthalmic imaging and microscopy. The real-time electronic adjustment of the spatial filtering function, enabled by the CMOS rolling shutter, has been used to effectively remove unwanted scattered light, perform dark-field imaging, polarization sensitive, fluorescence, ophthalmic, multi-wavelength, and interferometric imaging.

When performing confocal imaging with a CMOS rolling shutter and projector, a narrow rolling shutter width is usually desired in order to maximize the benefit of spatial filtering, which can remove unwanted scattered light and other artifacts from the resulting images. Usually, a fixed number of linear illumination patterns (N) is synchronized to the frame exposure of the CMOS sensor. The sensor is triggered every N patterns or, alternatively, the projector is triggered to display N patterns every sensor frame using the horizontal clock signal so that temporal and spatial synchronization between the illumination line and rolling shutter is maintained from frame to frame. A narrow shutter width is typically obtained with a short exposure time so that the frame rate can be maximized. A narrow shutter width can also be obtained with a lower horizontal clock frequency. In this case, the pattern exposure time can be increased while maintaining temporal synchronization, allowing more photons to be detected at a slower frame rate.

The temporal synchronization between the illumination patterns and rolling shutter can be adjusted using the input or output (strobe) trigger delay on either the projector or the sensor. The spatial synchronization can be adjusted by changing the illumination pattern geometry or starting position, as well as be adjusting the starting row of the imaging region of interest on the sensor. When performing dark field imaging, temporal adjustments to the synchronization are typically preferred since they do not cause a spatial shift in image features. Also, on some projectors and CMOS sensors, adjustment to the illumination pattern geometry or the imaging region of interest require an additional timing delay, which can result in a lost image frame.

Although the trigger delay can typically be adjusted on a frame-to-frame basis without causing a loss in the sensor frame rate, an alternative approach to adjusting the temporal synchronization is given in U.S. Pat. No. 8,237,835. In this approach, the sensor and digital light projector are run at slightly different frame rates in order to collect a series of repeating images with known timing offsets. The stated application for this mode of operation is to collect multiply scattered light image data to enhance image contrast or determine scattering properties of the target.

Triangulation-based depth profiling can be performed using the CMOS rolling shutter and projector operated in structured light mode by varying the temporal or spatial offset between the start of the sensor frame relative to the start of the projected patterns. By adjusting the temporal or spatial synchronization through software or hardware, referred to herein as a synchronization offset, the imaging system can be arranged to preferentially detect light return from a specific angle from the target. By quickly sweeping through a range of synchronization offsets (e.g. by changing, prior to the start of each frame, the pixel ROI starting row on the sensor or the trigger delay on the either the projector or sensor) and recording the offset that yielded the maximum pixel intensity, a depth profile of a sample can be quickly obtained with minimal post-processing. A priori calibration with known depth features can be performed to establish the relationship between the synchronization offset and physical depth changes. A key advantage of this system is that the angle of light return is precisely measured and can be rapidly adjusted electronically or through software in small (e.g. pixel or microsecond) increments. Unlike an on-axis confocal imaging system, a triangulation-based system uses the rolling shutter to spatially filter the angle of light return. The width of the illumination pattern lines and rolling shutter width determines the angular resolution of the light return, which is related to the achievable depth resolution. The range of synchronization offsets, combined with the depth of focus at the target, determines the range of resolvable angles of light return from the target, and is related to the measurable depth range. These relationships are expected and consistent with triangulation-based depth profiling theory. One embodiment of a triangulation-based depth profiling microscope using the above approach has been presented by spatially separating the illumination and detection light in a Fourier plane prior to the microscope objective.

When using the rolling shutter for confocal imaging or for triangulation-based depth profiling, a narrow shutter width is usually desired in order to maximize the benefit of spatial filtering, which removes unwanted scattered light and other artifacts from the resulting images. When a sufficiently narrow rolling shutter is used, a periodic series of line artifacts typically becomes visible in the resulting image, despite having good temporal and spatial synchronization across the image frame. These line artifacts are caused by the finite time required by the projector, either from hardware limitations or from the pattern period set by the user, to switch from one pattern to the next. During this pattern switching time period, also called the blanking interval, light is not incident on the sample. However, since the rolling shutter continues to expose pixel rows to light during the frame exposure without interruption, the detected light intensity on the rows during blanking periods will decrease. Prior art has documented this problem by showing the detected row-by-row intensity of a white card. This intensity profile shows a periodic series of lower intensity regions (darker rows), consistent with the blanking period of the projected patterns.

The darker rows in the image can be reduced or overcome by widening the rolling shutter width. If sufficiently wide, the light from adjacent illumination patterns will be collected during exposure, thereby reducing the decrease in intensity during blanking intervals. However, a wider shutter width allows more scattered light to reach the detector, which degrades optical sectioning performance in confocal imaging applications, and depth sectioning performance in triangulation-based depth profiling applications. The decrease in intensity can be modeled as a convolution between the illumination line patterns and the rolling shutter. A method that removes the blanking line artifacts from images while preserving a narrow shutter width for confocal imaging and triangulation-based depth mapping would be appreciated.

When the shutter width is narrow (i.e. smaller than the line pattern width) and the line patterns are projected with a duty cycle of less than 100%, the dark rows will be strongly visible in the images. Since the dark rows repeat after every pattern exposure, the overall image will appear to have a series of spatial fringes, with a frequency related to the number of line patterns that are used to spatially fill the image. These fringes are the result of a spatial-temporal relationship (the convolution) between the illumination lines and the rolling shutter. Unlike prior art that discloses periodic fringe patterns used in structured illumination microscopy and structured light imaging related devices and approaches, the time-averaged illumination is continuous across the field of view since the projected line patterns are adjacent, with no spatial gaps. To emphasize this point, if a global shutter CCD camera were to record a frame with the same exposure time, no fringes would appear in the image, since the fringes are due to the temporal relationship between the projected pattern and rolling shutter.

A common post-processing step required in phase measuring profilometry is that of phase unwrapping. Phase wrapping occurs when the spatial fringes that are projected onto a target appear phase-shifted by more than the fringe half-period at the sensor. To disambiguate the fringe phases for depth mapping, additional computationally post-processing steps are required. A method for phase measuring profilometry that avoids the phase wrapping ambiguity would be appreciated.

Prior art has described several phase measuring profilometry devices and methods that employ the use of a digital light projector to project single or multiple bit plane fringe patterns onto the target. In these systems, slight defocusing can be used to change the spatial intensity profile at the target from a square-wave to a sinusoid. The use of sinusoidal fringe patterns is generally preferred in these systems due to the less computationally complex post-processing steps required to determine the depth of the target features. Square-wave fringe patterns will contain higher order harmonics that are typically not completely removed from the image after processing. In a triangulation-based imaging system that uses projected line patterns that are synchronized to the rolling shutter exposure of a CMOS camera, the rolling shutter acts as a spatial filter to remove light return from different target depths. In this manner, fringes that would normally be phase-shifted due to scattering at different depths are attenuated when using a narrow shutter width, and can be selected with an adjustment to the spatial or temporal synchronization. A method that allows detected fringe patterns to be filtered to remove any residual non-linearity and high order harmonics to obtain a more optimal sinusoidal fringe pattern for use with well-known structured illumination imaging and structured light microscopy post-processing techniques would be appreciated.

The present invention is intended to improve upon and resolve some of these known deficiencies within the relevant art.

SUMMARY OF THE INVENTION

The present invention relates to a method of obtaining multiple images with a spatially varying periodic fringe pattern produced by a digital light projector that is spatially and temporally synchronized to the rolling shutter exposure of a two-dimensional pixel array detector. The projector is configured to operate in its structured light mode to display a series of adjacent line patterns on a target. The two-dimensional pixel array detector is configured to image a region on the target that is at least partially illuminated by the projector. At least one timing signal controls a spatial-temporal relationship between the rolling shutter exposure of the two-dimensional pixel array detector and the linear illumination patterns. A pixel array detector exposure time that is less than ten times the illumination pattern period is used in order to detect spatial fringe patterns that arise from the temporal interaction between the projected illumination patterns with a duty cycle of less than 100% and the narrow rolling shutter width on the pixel array detector. In this configuration, the rolling shutter exposure will record a decrease in detected light intensity during the 'off' or blanking time of each projected line pattern. Across the detected image, the decrease in detected light intensity will appear as a periodic series of fringe patterns, even when there is no spatial separation between illumination patterns at the target. The fringe amplitude, phase, and frequency can be controlled through adjustments to at least one of the illumination patterns, rolling shutter, and timing signal. With two or more images obtained with spatially shifted fringe patterns, the images are combined to form a composite image with the spatial fringes removed.

The appearance of spatial fringe patterns arises from a convolution between the rolling shutter exposure and the illumination patterns and becomes more noticeable in the images when the pattern exposure time is less than ten times the pattern period time. As the pixel array detector's exposure time is increased, the spatial filtering provided by the rolling shutter, and the amplitude of the spatial fringes, and their ability to remove unwanted scattered light and perform optical sectioning, decreases. When the exposure time is greater than approximately ten times the illumination pattern period, the visibility of the spatial fringes decreases to the extent that it no longer provides a pronounced improvement in removing unwanted scattered light from the images.

BRIEF DESCRIPTION OF THE DRAWINGS

The above-mentioned aspects of the present invention and the manner of obtaining them will become more apparent and the invention itself will be better understood by reference to the following description of the embodiments of the invention taken in conjunction with the accompanying drawings, wherein.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
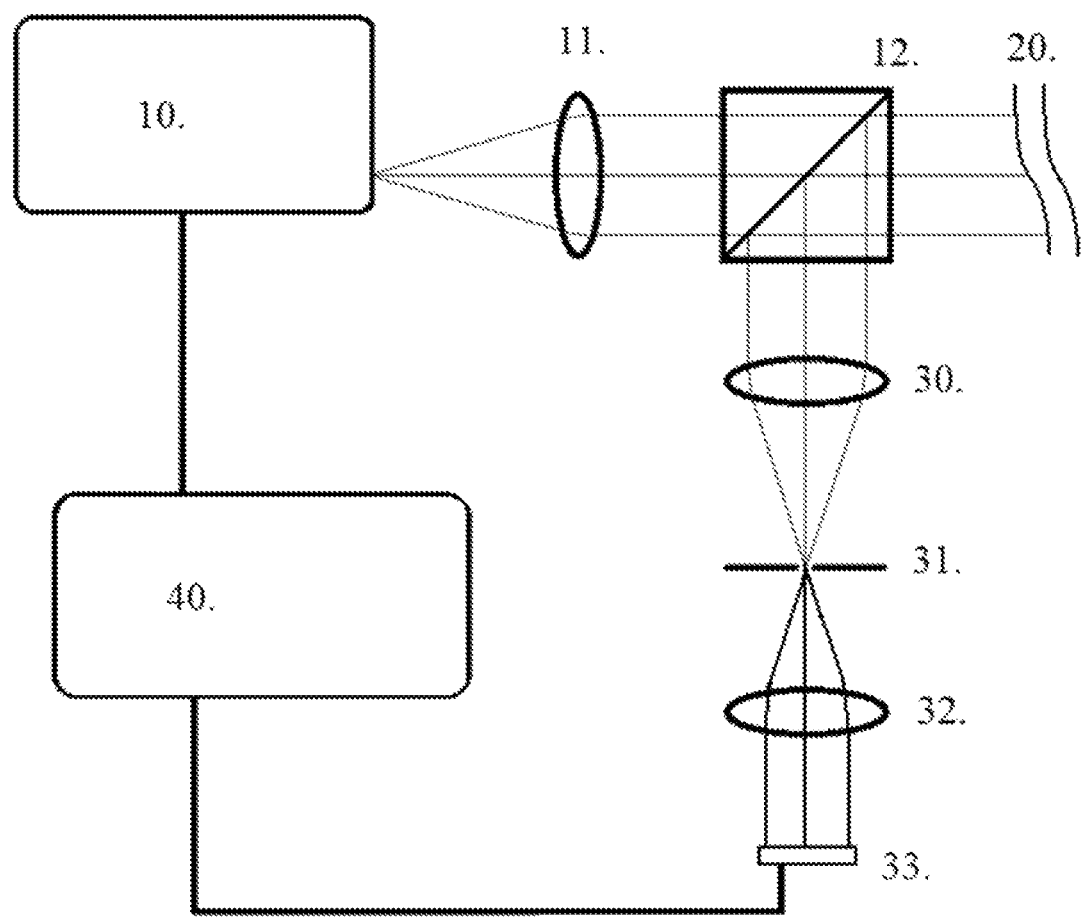
FIG. 1 is a schematic diagram of the optical pathway used for a confocal imaging device with a digital light projector source and a two dimensional pixel array detector that can be configured in accordance with the teachings of the present invention.

FIG. 1 shows one embodiment of the present invention for performing confocal imaging of a target. In accordance with this embodiment, a digital light projector 10 produces a sequence of linear illumination patterns that is directed through lens 11 and beamsplitter 12 and focused onto target 20. In this embodiment, 42 linear illumination patterns were preloaded into the digital light projector have a pre-defined exposure time of 0.250 msec that is less than the illumination pattern period of 0.500 msec. The light return from the target is directed back toward beamsplitter 12, where it is partially reflected and directed through lens 30, through a spatial filter 31 and lens 32 before it is focused onto the two-dimensional pixel array detector 33 with rolling shutter functionality. There exists at least one timing signal between the illumination patterns produced by digital light projector 10 and the two dimensional pixel array detector 33, which is used to create a spatial-temporal relationship between the position of the line patterns at the target 20 and the rolling shutter of the two dimensional pixel array detector 33 during a frame exposure. The pixel array detector 33 has an exposure time that is set to be less than ten times the illumination pattern period. In this embodiment, the exposure time is set to 0.250 msec. When configured according to this embodiment, the pixel array detector 33 can be used to detect a first image that has a periodic variation in spatial intensity. A new sequence of illumination patterns is then projected onto the target, with a spatial offset in the lines that is equal to one third of the line width. The trigger delay on the pixel array detector 33 is adjusted by one third of the pattern period, 0.167 msec, and a second image is obtained. This second image will also have a periodic variation in spatial intensity, but with its phase shifted by 120 degrees. The process is then repeated to obtain a third image with a phase shift of 240 degrees. The three phase-shifted images are then combined using well-known post-processing techniques in structured illumination microscopy: $I_{composite} = [(I_1-I_2)^2 + (I_1-I_3)^2 + (I_2-I_3)^2]^{1/2}$, where $I_1$, $I_2$ and $I_3$ refer to the three phase-shifted images and $I_{composite}$ refers to the composite image. The composite image performs optical sectioning, as the above processing technique removes low frequency detected intensities that are commonly associated with defocus and blur.

Figure 2:
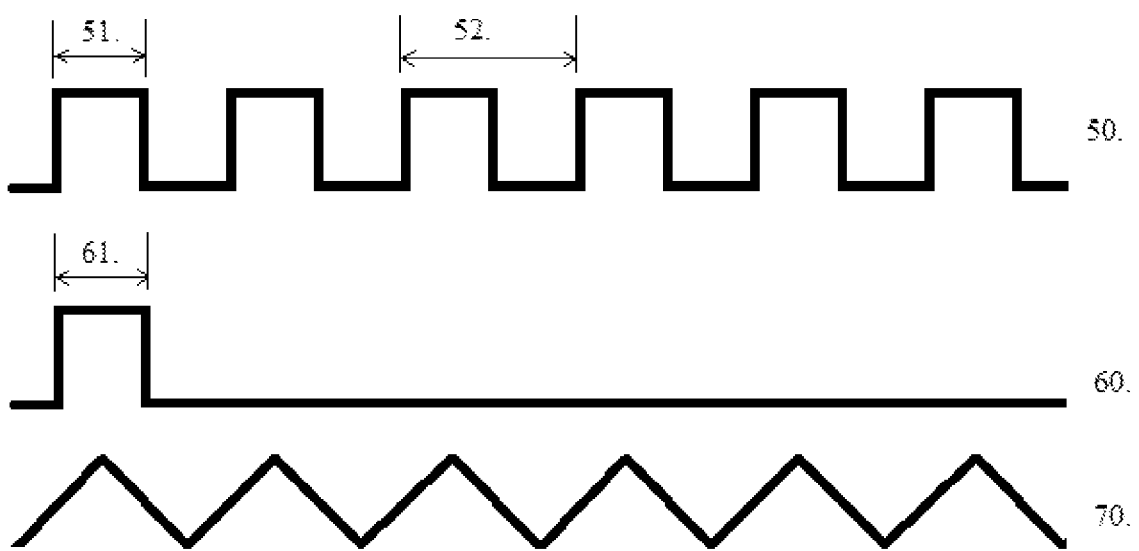
FIG. 2 is a schematic diagram of the temporal signals of the illumination patterns, the rolling shutter of the pixel array detector, and the convolution between the two, illustrating the periodic spatial variation in detected intensity obtained and used in accordance with the teachings of the present invention.

FIG. 2 schematically depicts a simplified model of the light intensity detected by the pixel array detector, with increasing intensity on the vertical scale. The illumination pattern timing 50 has a duty cycle of 50%, and proceeds left to right in time with a pattern exposure time 51 and pattern period 52. In the present embodiment, each line pattern is adjacent to the previous line in the pattern sequence, and the imaged line patterns progress from the top to the bottom of the region of interest exposed by the rolling shutter of the two dimensional pixel array detector. The rolling shutter exposure proceeds left-to-right as it progressively exposes pixel rows to light, shown in 60 near the start of the frame exposure with a rolling shutter width 61. As the rolling shutter progressively exposes rows, the illumination line patterns are projected in synchrony. The detected intensity, assuming good spatial overlap between the rolling shutter and the projected line patterns throughout the frame exposure is shown by the convolution of the projected line pattern timing with the rolling shutter 70. In actuality, the image intensity will also be affected by the target and the optical path, but for clarity and simplification purposes, the target is considered to be a perfect mirror. As the rolling shutter 60 gradually moves off the center of a projected line pattern, the pattern exposure will end, and the detected intensity 70 will decrease. The cross-sectional simulated intensity 70 is periodic and is a saw-tooth pattern in the case when the duty cycle is 50%. In this simplified model, the periodic fringe pattern shape will be adjusted by changing the pattern exposure time, the pattern period or the rolling shutter width. Note that since FIG. 2 illustrates just the temporal relationship between the illumination pattern and rolling shutter timing, effects caused by a change in spatial overlap between the patterns and rolling shutter, such as caused by a trigger delay, are not shown. To create a phase shift in the detected intensity 70, the illumination patterns are spatially shifted by one third the pattern period. To maintain good synchronization with the illumination patterns, the trigger delay for the start of frame on the pixel array detector is adjusted by one third the pattern period. In this case, a saw-tooth intensity pattern will be detected, but will be spatially shifted by one third of the pattern period.

In one embodiment of the present invention, the digital light projector pattern exposure time is minimized to project a maximum number of lines onto the target during a frame exposure of the two dimensional pixel array detector. The pixel array detector's exposure time is set to maximize the amplitude of the spatial fringes. In this embodiment, the fringe frequency and amplitude is maximized in order to maximize the effect of optical sectioning when creating the composite image in post-processing.

In accordance with another embodiment of the present invention, three phase-shifted fringe images are obtained to perform optical sectioning. The phase-shifted fringe images are obtained by pre-loading a sequence of line patterns into the projector for each of the three image frames. The line patterns in each of the three image frames are spatially offset by one third of the line width. The pattern exposure time is set to half the pattern period time, so as to create a 50% illumination duty cycle for each line pattern. The pixel array detector is triggered at the start of the projected line sequence for each of the three image frames, with its trigger delay set to spatially align the rolling shutter exposure with the currently projected line pattern sequence. The pixel array detector exposure time is set to the pattern exposure time to maximize the amplitude of the spatial fringes. The phase-shifted fringe images are combined in post-processing to eliminate the appearance of spatial fringes in the composite image, and to remove unwanted scattered light from the image.

In a related embodiment of the present invention, the two-dimensional pixel array detector with rolling shutter functionality is a two-dimensional CMOS sensor with rolling shutter functionality.

In a related embodiment of the present invention, the phase-shifted fringe images are obtained by pre-loading a sequence of line patterns into the projector for each of four image frames. The line patterns in each of the four image frames are spatially offset by one quarter of the line width. The pixel array detector is triggered at the start of the projected line sequence for each of the four image frames, with its trigger delay set to spatially align the rolling shutter exposure with the currently projected line pattern sequence. The phase-shifted fringe images are combined in post-processing to eliminate the appearance of spatial fringes in the composite image, and to remove unwanted scattered light from the image.

In a related embodiment of the present invention, the digital light projector is triggered by the frame exposure of the pixel array detector. In this embodiment, each phase-shifted line pattern sequence is triggered at the start of an image frame, with a trigger delay set to spatially align the rolling shutter exposure with the currently projected line pattern sequence. The phase-shifted fringe images are combined in post-processing to eliminate the appearance of spatial fringes in the composite image, and to remove unwanted scattered light from the image.

In accordance with another embodiment of the present invention, the frequency of the detected periodic variation in intensity is changed during a frame exposure, or between frame exposures, by modulating the pixel clock frequency or horizontal clock frequency with the pattern exposure time. The frequency-shifted fringe images are combined in post-processing to eliminate the appearance of spatial fringes in the composite image, and to remove unwanted scattered light from the image.

In accordance with another embodiment of the present invention, a spatial gap exists between adjacent illumination line patterns. In this embodiment, the size and position of the spatial gap is conjugate to the pixel array detector rows that are exposed during each illumination pattern blanking period. The spatial gaps between the patterns help to reduce unnecessary light exposure of the target and potentially unwanted scattered light from reaching the detector without changing the fringe patterns.

In accordance with a related embodiment of the present invention, a spatial gap exists between adjacent illumination line patterns. In this embodiment, the spatial gap is used in combination with the temporal interaction between the digital light projector exposure time and rolling shutter exposure to help shape the amplitude, frequency or phase of the resulting periodic fringe patterns.

In accordance with another embodiment of the present invention, three phase-shifted fringe images are obtained to perform optical sectioning. In this embodiment, the projected illumination patterns each include multiple lines that are offset by a multiple of the one third of the line width. Each set of lines progressively moves across the field of view and is used to obtain an image containing periodic fringes with a different phase shift. When the lines are separated by more than two times the rolling shutter width, light from only one of the lines in a projected pattern is detected. In this embodiment, the pixel array detector is triggered by the start of the illumination pattern sequence. After each frame exposure, the trigger delay is adjusted so that the rolling shutter is spatially synchronized to a different, phase-shifted, line in the pattern. In this embodiment, the field of view of the composite image is decreased to the field of view illuminated by all three phase-shifted lines.

In accordance with another embodiment of the present invention, three phase-shifted fringe images are obtained to perform optical sectioning. In this embodiment, the projector is configured to display 42 illumination patterns in a loop, with three phase-shifted lines projected onto the target per illumination pattern. The timing electronics are set such that the pixel array detector is triggered every 56 patterns displayed. The 14 pattern offset between the number of patterns in the sequence and the number of patterns per trigger, causes a different phase-shifted line to be projected at the start of each frame. The pattern offset is chosen so that the line patterns repeat every three sensor frames (42/14=3). In this embodiment, the field of view of the composite image is nearly the same as the individual spatial fringe images. The pixel array detector trigger delay needs to be only adjusted by one third of the pattern period to spatially align the rolling shutter with the phase shifted illumination line. The phase-shifted fringe images are combined in post-processing to eliminate the appearance of spatial fringes in the composite image, and to remove unwanted scattered light from the image.

In a related embodiment of the present invention, the phase-shifted fringe images are digitally filtered using a comb or bandpass filter to separate the fringe spatial frequency signal from the rest of the image. The digital filtering step is performed in order to remove noise from the fringe images, in particular high order harmonics, phase noise, and nonlinear spatial fringe shapes so that a cross-sectional intensity profile that more closely resembles a sinusoid can be used to remove unwanted scattered light and create a composite image with lower residual noise.

In another embodiment of the present invention, the projector and pixel array detector partially use the same optical axis to illuminate and image a target. In this embodiment, phase-shifted fringe images are combined in post-processing to eliminate the appearance of spatial fringes in the composite image, to perform optical sectioning and to remove unwanted scattered light from the image.

In another embodiment of the present invention, the projector and pixel array detector are arranged so that the illumination pathway from the projector to the target is different from the detection pathway from the target to the pixel array detector. In this embodiment, light transmitted through the sample is predominantly detected. In this embodiment, phase-shifted fringe images are combined in post-processing to eliminate the appearance of spatial fringes in the composite image, to perform optical sectioning, and to remove unwanted scattered light from the image.

In another embodiment of the present invention, the projector and pixel array detector are arranged so that the illumination pathway from the projector to the target is different from the detection pathway from the target to the pixel array detector. In this embodiment, the illumination pathway is angularly offset from the detection pathway so as to perform triangulation-based depth imaging. In this optical arrangement, light scattered from different target depths is laterally shifted on the pixel array detector a direction parallel to the row-by-row rolling shutter exposure. In this embodiment, the projector is configured to display 42 illumination patterns in a loop, with three phase-shifted lines projected onto the target per illumination pattern. The timing electronics are set such that the pixel array detector is triggered every 56 patterns displayed. The 14 pattern offset between the number of patterns in the sequence and the number of patterns per trigger, causes a different phase-shifted line to be projected at the start of each frame. In this embodiment, the rolling shutter acts as a spatial filter for light returning from the target from different depths. The pixel array detector trigger delay is adjusted to synchronize the rolling shutter with each of the three phase-shifted illumination lines. Phase-shifted fringe images are obtained with a pixel array detector exposure time that is less than ten times the illumination pattern period. Phase shifted images are combined in post-processing to eliminate the appearance of spatial fringes in the composite image and to remove unwanted scattered light from the image.

In a related embodiment of the present invention, the trigger delay on the pixel array detector is provided an additional offset to adjust the depth at which light is preferentially detected. The additional trigger delay offset can be stepped through a range to perform depth mapping of a three dimensional target.

In a related embodiment of the present invention, the phase-shifted fringe images are digitally filtered using a comb or bandpass filter to separate the fringe spatial frequency signal from the rest of the image. The digital filtering step is performed in order to remove noise from the fringe images, in particular light scattered from the target that is outside the current depth window set by the rolling shutter width and trigger delay offset.

In a related embodiment of the present invention, the illumination pathway is angularly offset from the detection pathway so as to perform triangulation-based depth imaging. In addition to adjusting the trigger delay to align the rolling shutter with a spatially phase-shifted illumination line, the pixel array detector trigger delay is offset to preferentially collect light from different depths from a target. In this embodiment, image data from a partial or complete depth map is used to adjust the shape of the illumination line patterns. Specifically, if the top half of the image was visible at a different trigger delay offset than the bottom half of the image, the illumination patterns are adjusted so that the top half of the illumination lines is spatially shifted until both the top and the bottom half of the image are visible in a composite image obtained with a single trigger delay offset. By adjusting the illumination lines based on a previously obtained set of images, target features at multiple depths can be imaged without adjusting the trigger delay offset.

In another related embodiment of the present invention, the illumination pathway is angularly offset from the detection pathway so as to perform triangulation-based depth imaging. In addition to adjusting the trigger delay to align the rolling shutter with a spatially phase-shifted illumination line, the pixel array detector trigger delay is offset to preferentially collect light from different depths from a target. In this embodiment, multiple digital light projectors are used to illuminate the target with a sequence of line patterns. In this embodiment, both projectors can be used to trigger the start of the pixel array detector frame exposure, and the projector in use during a frame exposure is controlled in software. In this embodiment, the projectors are set at different angular offsets from the pixel array detector, and are used for providing images with either a larger depth of field, or a higher depth resolution.

In another embodiment of the present invention, image data from the pixel array detector is used as feedback to adjust the illumination pattern geometry, pattern period, pattern exposure time, spatial-temporal synchronization between the illumination patterns and the rolling shutter exposure of the pixel array detector, the rolling shutter exposure time of the pixel array detector, the operating parameters of the pixel array detector, such as: the frame rate, gain and pixel region of interest; or other common operating parameters of digital light projectors, such as: illumination source driving current, driving current frequency, driving current phase, driving current pulse width and duty cycle. In this embodiment, image feedback, either from the individual spatial fringe images, or the composite image, is used to optimize the detected spatial fringe amplitude, frequency, or phase shifts, the residual phase or other pattern noise in the composite image, the brightness and contrast of the image, or the spatial and temporal synchronization between the illumination patterns and the rolling shutter exposure on the pixel array detector.

In another embodiment of the present invention, the pixel array detector has a rolling shutter exposure that proceeds from the center to the outer edges of the pixel array detector area. In this embodiment, the pixel array detector is said to have two rolling shutters, an upper and a lower rolling shutter. The projector is configured to project two lines per illumination pattern, each synchronized to the upper and lower rolling shutter, respectively. The pixel array detector is triggered from the start of the pattern sequence by the projector. The projector is configured to display three sequences of illumination patterns. The lines in each sequence are spatially offset by one third of the line width. The pixel array detector trigger delay is adjusted each frame so that the rolling shutter is aligned with the spatially offset line patterns, and the exposure time is set to be less than ten times the illumination pattern period. Phase shifted images are combined in post-processing to eliminate the appearance of spatial fringes in the composite image and to remove unwanted scattered light from the image.

In a related embodiment, the pixel array detector has an upper and a lower rolling shutter. In this embodiment, the projector is configured to display 42 illumination patterns in a loop, with six phase-shifted lines projected onto the target per illumination pattern, with three lines illuminating the field of view detected by the upper rolling shutter, and three lines illuminating the field of view detected by the lower rolling shutter. The timing electronics are set such that the pixel array detector is triggered every 56 patterns displayed. The 14 pattern offset between the number of patterns in the sequence and the number of patterns per trigger, causes a different phase-shifted line to be projected at the start of each frame. The pattern offset is chosen so that the line patterns repeat every three sensor frames (42/14=3). The pixel array detector trigger delay needs to be only adjusted by one third of the pattern period to spatially align the rolling shutter with the phase shifted illumination line. The phase-shifted fringe images are combined in post-processing to eliminate the appearance of spatial fringes in the composite image, and to remove unwanted scattered light from the image.

In yet another embodiment, the projector is configured to operate in its structured light mode using patterns provided by an external video source, such as a video driver from a personal computer. A 24-bit RGB video input is configured so as to produce three sequences of phase-shifted line patterns by updating the video input with new phase shifted line patterns before the start of the frame exposure of the pixel array detector. In this embodiment, the use of an external video source, as opposed to pre-loaded fixed patterns, can be updated in real-time according to user input, or to image feedback from the target, which can be useful in dynamic imaging applications, such as recording 3D video or monitoring target dynamics. The phase-shifted fringe images are combined in post-processing to eliminate the appearance of spatial fringes in the composite image, and to remove unwanted scattered light from the image.

In yet another embodiment, the projector is operated with three illumination sources. Each illumination source is used to project the same illumination patterns set by the DMD, but is driven with a phase-shifted exposure time that is less than the pattern period to create a spatially offset pattern at the target. In this embodiment, the illumination source used to project light onto the target changes each frame exposure. The pixel array detector's frame exposure is triggered by the start of the pattern sequence, and the trigger delay is set to align the rolling shutter exposure with each of the spatially offset patterns. The pixel array detector's exposure time is set to be less than ten times the pattern period, so as to detect a periodic variation in spatial intensity across the frame. The use of multiple projector sources that are driven with a phase delayed pattern exposure time creates phase shifted fringes in the images, which are combined in post-processing to eliminate the appearance of spatial fringes in the composite image, and to remove unwanted scattered light from the image.

In a related embodiment, the projector is operated with three illumination sources. Each illumination source is used to project the same illumination patterns set by the DMD, but is driven with a phase-shifted exposure time that is less than the pattern period to create a spatially offset pattern at the target. In this embodiment, the illumination sources emit light at different wavelengths, such as red, green, and blue, and all three illumination sources are used to project light onto the target simultaneously. The light from the target is split into three separate pathways, is filtered by wavelength, and directed to three pixel array detectors, each set to synchronize their respective illumination line patterns to their rolling shutter exposure. Each pixel array detector obtains phase-shifted spatially varying fringe patterns that can be combined into a single composite image in post-processing to eliminate the appearance of spatial fringes, to perform optical sectioning, and to remove unwanted scattered light from the image.

In another embodiment of the present invention, multiple projectors and multiple pixel array detector pairs are used to illuminate and image a target. Each projector and pixel array detector pair is set at a different orientation, and the start of frame exposures are staggered to avoid cross-talk. Images containing spatial fringes are obtained with different fringe orientations, which are combined to produce a composite image with greater spatial resolution than present in any of the individual fringe images.

In another embodiment of the present invention, two pixel array detectors are used to image a target. The first pixel array detector uses a rolling shutter method of detection, with an exposure time that is less than ten times the illumination pattern period. A second pixel array detector uses either a global shutter method of detection, or a rolling shutter method of detection with either a global release function, or with an exposure time greater than ten times the illumination pattern period. The second pixel array detector is used to capture a wide-field image of the target, without spatial fringes. The first pixel array detector is used to capture a series of phase-shifted fringe pattern images. The phase-shifted image frames are used to create a composite optically sectioned image in post-processing, and are then combined with the wide-field image in post-processing to create a second composite image with reduced pattern noise caused by phase noise in the fringe patterns, non-linearity and higher harmonics in the fringe patterns, and visibility of the projector pixels in the composite image.

While an exemplary embodiment incorporating the principles of the present invention has been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for digital imaging, the method comprising the steps of:
    operating a digital light projector to produce two or more linear illumination patterns having a pre-defined illumination pattern duty cycle that is less than 100%;
    directing light from the two or more produced linear illumination patterns onto a target;
    directing light from the target to a two dimensional pixel array detector having a rolling shutter exposure functionality and a pre-defined exposure time;
    using a timing signal to control a spatial-temporal relationship between the rolling shutter exposure of the two dimensional pixel array detector and the two or more produced linear illumination patterns;
    detecting a first image having a periodic variation in spatial intensity by setting the exposure time of the two dimensional pixel array detector to less than ten times an illumination pattern period;
    adjusting a spatial-temporal relationship between the rolling shutter exposure of the pixel array detector and the two or more produced linear illumination patterns to detect one or more additional images having a change in at least one of an amplitude, frequency, or phase of a periodic variation in spatial intensity with respect to the first image; and
    combining the first image and the one or more additional images to create a composite image.

2. The method of claim 1, wherein the step of operating the digital light projector to produce the two or more linear illumination patterns comprises operating a digital light projector having an illumination source, relay optics, driver electronics and a digital micromirror array.

3. The method of claim 1, wherein the step of adjusting the spatial-temporal relationship between the rolling shutter exposure and the two or more produced linear illumination patterns comprises using at least one of:
    an illumination pattern exposure time;
    an illumination pattern period;
    an illumination pattern input trigger delay;
    an illumination pattern output trigger delay;
    a pixel array detector exposure time;
    a pixel array detector pixel clock frequency;
    a pixel array detector horizontal clock frequency;
    a pixel array detector input trigger delay;
    a pixel array detector output trigger delay;
    at least one of a length, width, orientation, spacing and position of the two or more produced linear illumination patterns; and
    a pixel array detector region of interest.

4. The method of claim 2, further comprising using image data obtained by the pixel array detector to adjust at least one of:
    the spatial-temporal relationship between the rolling shutter exposure of the pixel array detector and the two or more produced linear illumination patterns;
    the length, width, orientation, spacing or position of the two or more produced linear illumination patterns;
    operating parameters of the illumination source, the operating parameters being selected from at least one of driving current, driving current frequency, driving current phase, driving current pulse width and duty cycle; and
    operating parameters of the pixel array detector, the operating parameters being selected from at least one of frame rate, gain and pixel region of interest.

5. The method of claim 2, wherein the illumination source of the digital light projector is selected from at least one of:
    a light emitting diode;
    a fiber-coupled light emitting diode;
    a fiber-coupled semiconductor laser source; and
    a semiconductor laser source.

6. The method of claim 2, wherein the digital light projector further comprises a second illumination source for producing the two or more linear illumination patterns.

7. The method of claim 6, wherein at least one of the first and second illumination sources exhibits at least one operating parameter that is different from the other illumination source, the at least one operating parameter being selected from an illumination source wavelength, an illumination source output power, an illumination source driving current frequency, an illumination source driving current phase, and illumination source driving current pulse width and an illumination source duty cycle.

8. The method of claim 2, further comprising producing the two or more linear illumination patterns with a second digital light projector and directing produced light onto a second target.

9. The method of claim 8, wherein the two or more produced linear illumination patterns exhibit a feature that is different from the two or more illumination patterns produced by the first digital light projector, the feature being selected from at least one of:
- a length, width, orientation, spacing and position of the two or more produced linear illumination patterns;
- the illumination pattern period;
- an illumination pattern exposure time;
- the spatial-temporal relationship between the rolling shutter exposure of the pixel array detector and one of the two or more produced linear illumination patterns provided by the first digital light projector; and
- operating parameters of the illumination source, the operating parameters being selected from driving current, driving frequency, driving phase, driving pulse width and duty cycle.

10. The method of claim 1, further comprising directing light from the target to a second pixel array detector having a rolling shutter exposure functionality with a pre-determined exposure time that is configured to be less than ten times the illumination pattern period to detect one or more additional images with a change in at least one of amplitude, frequency or phase of a periodic variation in spatial intensity with respect to a first image.

11. The method of claim 10, wherein the rolling shutter exposure of the second pixel array detector exhibits a feature different from the rolling shutter exposure of the first pixel array detector, the feature being selected from at least one of:
- an orientation of the rolling shutter exposure;
- an exposure time;
- the spatial-temporal relationship between the rolling shutter exposure of the first pixel array detector and the two or more produced linear illumination patterns provided by the digital light projector; and
- operating parameters of the first pixel array detector, the operating parameters being selected from frame rate, pixel clock frequency, horizontal clock frequency, gain and pixel region of interest.

12. The method of claim 8, further comprising directing light from the second target to a second pixel array detector having a rolling shutter exposure functionality with a pre-determined exposure time that is configured to be less than ten times the illumination pattern period to detect one or more additional images with a change in at least one of the amplitude, frequency or phase of a periodic variation in spatial intensity with respect to a first image.

13. The method of claim 1, further comprising directing light from the target to a second pixel array detector having a rolling shutter exposure functionality with at least one of a global reset feature and a pre-defined exposure time that is set to be greater than ten times the illumination pattern period to detect an image with lower amplitude in the periodic variation in spatial intensity with respect to the first image.

14. The method of claim 1, further comprising directing light from the target to a second pixel array detector having a global shutter exposure functionality.

15. The method of claim 1, wherein the step of producing an illumination pattern with a duty cycle less than 100% is achieved using at least one of:
- an illumination source driving current having a duty cycle less than 100%; and
- a digital micromirror array driving current having a duty cycle less than 100%.

\* \* \* \* \*